United States Patent [19]

Kaneyuki

[11] Patent Number: 4,679,456
[45] Date of Patent: Jul. 14, 1987

[54] AUXILIARY DEVICE DRIVING UNIT DRIVEN BY A VEHICLE ENGINE

[75] Inventor: Kazutoshi Kaneyuki, Himeji, Japan

[73] Assignee: Mitsubishi Denki Kabushiki Kaisha, Tokyo, Japan

[21] Appl. No.: 809,786

[22] Filed: Dec. 17, 1985

[30] Foreign Application Priority Data

Dec. 17, 1984 [JP] Japan ................ 59-267968

[51] Int. Cl.$^4$ ............................ F16H 15/16
[52] U.S. Cl. ................ 74/752 D; 74/191; 74/796
[58] Field of Search ........... 180/53.8; 474/11; 74/752 D, 191, 796

[56] References Cited

U.S. PATENT DOCUMENTS

| | | | |
|---|---|---|---|
| 3,108,494 | 10/1963 | Kell | 74/752 D |
| 3,157,066 | 11/1964 | Donley et al. | 74/781 R |
| 3,182,519 | 5/1965 | Grieshaber | 74/191 |
| 3,469,473 | 9/1969 | Förster et al. | 74/752 D |
| 4,232,561 | 11/1980 | Kashihara et al. | 74/191 |
| 4,468,984 | 9/1984 | Castelli et al. | 74/191 |

FOREIGN PATENT DOCUMENTS 58-86434 6/1983 Japan .
58-200838 11/1983 Japan .

OTHER PUBLICATIONS

Automotive Engineering Magazine, U.S.A., Oct. 1984, p. 50.

Primary Examiner—John A. Pekar
Attorney, Agent, or Firm—Oblon, Fisher, Spivak, McClelland & Maier

[57] ABSTRACT

An auxiliary device driving unit connectable to an engine of a vehicle has a frictional transmission type stepless speed-change gear with a differential planetary structure disposed in a transmission system for transmitting a force from a input shaft connected to the crank shaft of the engine to a pulley for driving auxiliary devices. Control of change in speed is performed by shifting a speed-change ring as an element of speed-changing in the axial direction of the input shaft. An actuator for shifting the speed-change ring is constituted by an non-contact type electromagnetic brake immovably attached to the stepless speed-change gear, a ring-shaped cam connected to a rotating element of the electromagnetic brake, a cam follower fixed to the speed-change ring to be in contact with a cam surface formed in the cam, and an electric circuit for controlling the electromagnetic brake depending on the condition of operations of the auxiliary devices.

7 Claims, 5 Drawing Figures

AUXILIARY DEVICE DRIVING UNIT DRIVEN BY A VEHICLE ENGINE

The present invention relates to an auxiliary device driving unit for driving auxiliary devices mounted on a vehicle.

In automobiles or other vehicles, auxiliary devices such as a charging generator, a water pump, a compressor for air-conditioning, an oil pump for oil servo-steering and so on are belt-driven by a crank pulley provided at the end of the crank shaft connected to an vehicle engine. When the auxiliary devices are driven at the high speed operation of the engine, there causes a great power loss. Accordingly, there has been proposed a method of controlling operating speeds of the auxiliary devices by changing speed of the crank pulley with respect to a rotational speed of the engine to thereby avoid a great power loss. For instance, a technique described in Japanese Unexamined Patent Publication No. 200888/1983 is such that the revolution of the crank pulley is selectively changed in two steps with respect to the revolution of the engine by providing a speed-reduction driving system comprising a planetary reduction gear and a one-way clutch and a directly coupled driving system comprising a directly connected clutch provided with a hydraulic piston. The above-mentioned two systems are interposed between the crank shaft of the engine and the crank pulley. However, the conventional technique has disadvantages from the standpoint of practical use that since a sudden change in speed takes place at the time of changing a gear, change of a force for driving the auxiliary devices imparts a shock to the engine thereby causing variation in a force for driving the vehicle, whereby a stable cruising of the vehicle can not be obtained; a driver feels uneasiness; withstand properties of the planetary reduction gear becomes inferior and there arises a problem of noise.

On the other hand, a technique proposed in, for instance, Japanese Unexamined Utility Model Publication No. 86484/1983 is to utilize a pulley whose effective diameter of the pitch is variable. Namely, a driving pulley in which the pitch is variable is mounted on a crank shaft, and a driven pulley of variable pitch which is integrally connected to a pulley for driving auxiliary devices is provided so as to follow the driving pulley, whereby speed for driving the auxiliary devices is controlled by controlling a movable sheave of the driven pulley by means of an oil cylinder. In the later case, however, it is necessary to use a strong oil pressure source which controls the movable sheave of the driven pulley. Further, the construction of an oil actuator is fairly complicated and a substantial space is needed for the pulleys which project in the direction of the crank shaft of the engine. Accordingly, it is unsuitable to apply it to a horizontal engine type front-wheel drive vehicle having a limited space for the engine, which are widely used at present.

It is an object of the present invention to eliminate the disadvantages of the conventional device and to provide an auxiliary device driving unit which is free from a shock and noise caused at the time of changing speed; has a sufficient space replaceable by the ordinary crank pulley and allows the revolution of the engine to change to a suitable revolution of the driving pulley in a stepless manner to thereby perform a fine speed control in response to the condition of operations of the auxiliary devices.

The foregoing and the other objects of the present invention have been attained by providing an auxiliary device driving unit connectable to an engine of a vehicle, which has an input shaft connected to a crank shaft of the engine, a pulley connected to auxiliary devices through belts and a transmission system for transmitting a rotational force from the input shaft to the pulley, characterized by comprising a frictional transmission type stepless speed-change gear which is provided with an input-transmission member mounted on the input shaft, a plurality of conical planet cones which are rotated around their own axes by receiving a rotational force from the input-transmission member, an orbit ring as a stationary element having frictional engagement with the planet cones to guide the revolution of the planet cones, a speed-change ring which is in frictional contact with the frictional transmission surface including the cone generatrix of each of the planet cones and is shiftable in the direction of the axis of the input shaft, means for transmitting a rotational force of the speed-change ring to the pulley, a non-contact type electromagnetic brake attached to a fixed plate for supporting the orbit ring as a stationary element of the speed-change gear, a cam connected to a rotating element of the electromagnetic brake, a cam follower fixed to the rotating element and being in contact with the cam, and an electric circuit for controlling the electromagnetic brake depending on the condition of operations of the auxiliary devices of the engine.

An embodiment of the present invention will be described with reference to drawing.

Figure 1:
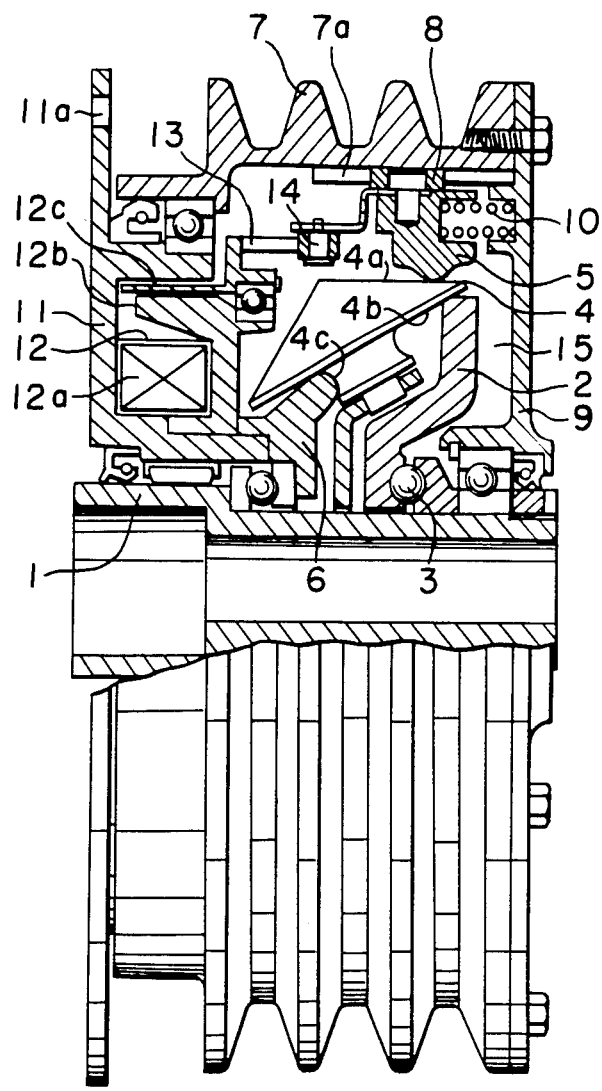
FIG. 1 is a front view partly cross-sectioned of an embodiment of the auxiliary device driving unit for a vehicle engine according to the present invention.

In FIG. 1, a reference numeral 1 designates an input shaft directly connected to the crank shaft of a vehicle engine. An input-transmission member 2 is mounted on the input shaft 1. A cam device 3 is interposed between the input shaft 1 and the input-transmission member 2 to impart a pressing force to the input-transmission member. A reference numeral 4 designates a plurality of planet cones having a conical shape, each of which is generally provided with a first frictional transmission surface 4a including the cone generatrix, a second frictional transmission surface 4b formed in the bottom surface of the cone and a third frictional transmission surface 4c formed in the side surface of a shaft portion extending downwardly from the bottom surface of the cone. Each of the planet cones 4 is further provided with an extension from the lower surface of the shaft portion, and the extension is inserted in a rotatable manner in each hole which is formed in a circular disk member having a slanted outer circumference. The circular disk member is rotatably fitted on the input shaft 1 so as to be adjacent to the input-transmission member 2.

Since each of the planet cones 4 is held by the circular disk member by inserting the extension of the planet cone in the hole of the disk member at the slanted portion, a cone generatrix of the planet cone extends in parallel to the axial line of the input shaft 1. A speed-change ring 5 of a ringed form is placed at the diametrically outer side of the planet cones so that it is in frictionally contact with the first frictional transmission surface 4a of the planet cones 4. The speed-change ring is adapted to move in the direction parallel to the axial line of the input shaft while keeping a contacting state to the planet cones 4 to thereby change a radius of the frictional transmission of each of the planet cones 4. An orbit ring 6 is placed at the opposite position with respect to the circular disk member, to be in frictionally contact with the third frictional transmission surface 4c of the planet cones 4. The orbit ring 6 is immovably placed around the input shaft 1 to guide the planet cones 4 to rotate on a circle around the center of the input shaft 1. The outer edge of the input-transmission member 2 is in frictionally contact with the second frictional transmission surface 4b of the planet cones 4. A force for pressing the input-transmission member 2 in the axial direction of the input shaft which is given by the cam device 3. The cam force is determined in such a manner that pressing forces acting on the first, second and third frictional transmission surfaces of the planet cones 4 in the normal directions of the surfaces are balanced in vectors by forces of reaction received by the speed-change ring 5, the input-transmission member 2 and the orbit ring 6.

A pulley 7 for driving auxiliary devices is provided with at its inner cylindrical surface a plurality of key grooves 7a extending in parallel to the axial line of the input shaft. On the other hand, the speed-change ring 5 has roller keys 8 in the number corresponding to the key grooves 7a. By fitting the roller keys 8 into the key grooves 7a, a rotating force of the speed-change ring 5 is transmitted to the pulley 7, and the speed-change ring is movable to the axial direction along the key grooves 7a. A side plate 9 is provided on the input shaft 1 with a bearing and outer circumference of the side plate is connected to the pulley 7 to support the same. A spring is interposed between the inner surface of the side plate and a side surface of the speed-change ring 5 so that the ring 5 is usually pushed in the apex of the planet cones 4 along the first frictional transmission surface 4a.

Figure 2:
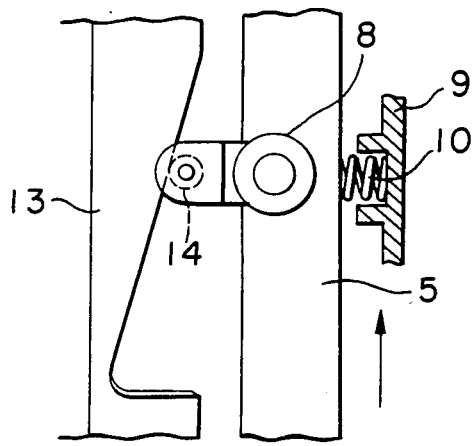
FIG. 2 is a diagram of an embodiment of the cam mechanism as in FIG. 1 when it is viewed from the direction of the circumference.

A reference numeral 11 designates a fixed plate having a fitting part 11a which is fixedly supported by a stationary member of the engine and immovably supports the orbit ring 6. An eddy current type electromagnetic brake is formed by utilizing a part of the fixed plate 11 as a part of a magnetic core, and constituted by an electromagnetic coil 12a, a pole 12b and an eddy current cup 12c made of good conductive material supported by the pole 12b by means of a bearing. A cam 13 is integrally attached to the eddy current cup 12c and has a cam surface facing the speed-change ring 5. A cam follower 14 is supported by the speed-change ring 5 and is in contact with the cam surface of the cam 13. Arrangement of the cam 13, the cam follower 14 and the speed-change ring 5 is detailedly shown in FIG. 2 which is a diagram seen from the direction of the circumference of the speed-change ring 5.

Oil 15 as a medium of frictional transmission is contained in a space which is surrounded by the pulley 7, the side plate 9, the fixed plate 11 and the input shaft 1.

Figure 3:
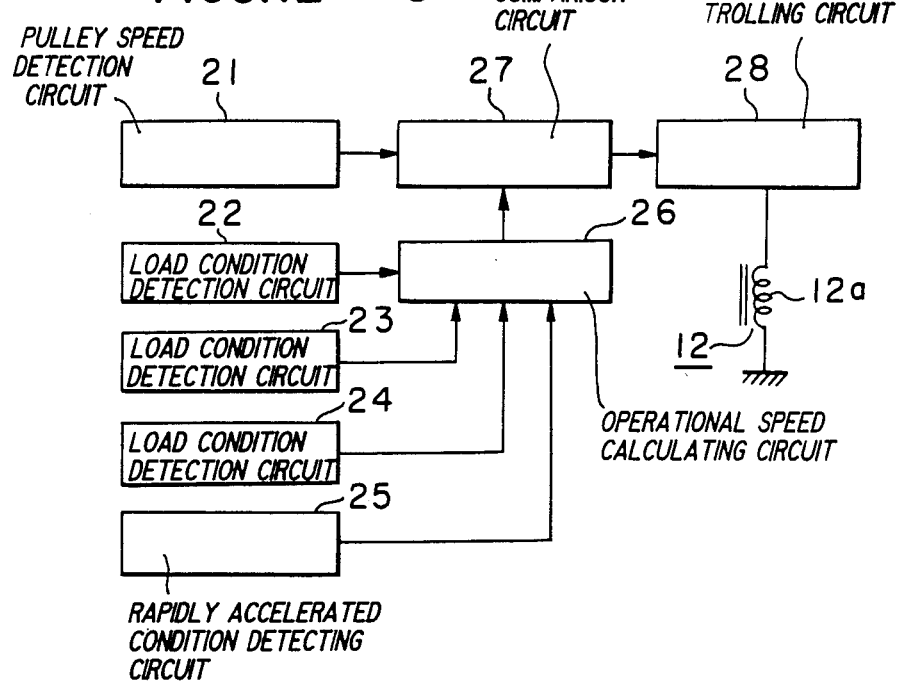
FIG. 3 is a block diagram of an embodiment of the electrically controlling circuit of the present invention.

FIG. 3 shows an example of the electrically controlling circuit for controlling the electromagnetic brake 12 of the present invention. The controlling circuit generally comprises a pulley speed detection circuit to detect the revolution of the pulley 7 for driving the auxiliary devices, a load current detection circuit 22 for a charging generator, a load detection circuit 23 for a compressor used for air conditioning, an engine-cooling-water-temperature detection circuit 24 to detect condition of operations of a water pump required to forcibly circulating cooling water for the engine, a rapidly accelerated condition detecting circuit 25 for an engine which temporarily controls a power to operate the auxiliary devices in the minimum power when the engine is rapidly accelerated, an operational speed calculating circuit 26 which determines the optimum revolution speed for operating the auxiliary devices depending on signals from the detection circuits 22, 23, 24, 25, a comparison circuit 27 which compares a signal from the operational speed calculating circuit 26 with a signal from the pulley speed detection circuit 21, and an electromagnetic brake controlling circuit which performs duty control of a current in the electromagnetic coil 12a of the electromagnetic brake 12 depending on a signal from the comparison circuit 27.

The operation of the embodiment having the construction as above-mentioned will be described.

A driving force of the input shaft 11 is transmitted to the input-transmission member 2 through the cam device 3. Then, the planet cones 4 are caused to rotate around their own axes and to revolve around the axial center of the input shaft 1 along the orbit ring 6 as a stationary element. The speed-change ring 5 in frictionally contact with the first frictional transmission surface 4a on the cone generatrix of the planet cones 4 receives a driving force due to differential movement of the rotation and the revolution of the planet cones 4 and a ratio of radius of transmission, whereby the speed-change ring 5 drives the pulley 7 by means of the roller keys 8 and the key grooves 7a. In this case, a ratio of the revolution of the input shaft 1 to the speed-change ring 5 can be arbitrarily determined by shifting the speed-change ring 6 in the axial direction of the input shaft, which changes a ratio of effective radius of the frictional transmission between the speed-change ring 5 and the planet cones 4.

Figure 4:
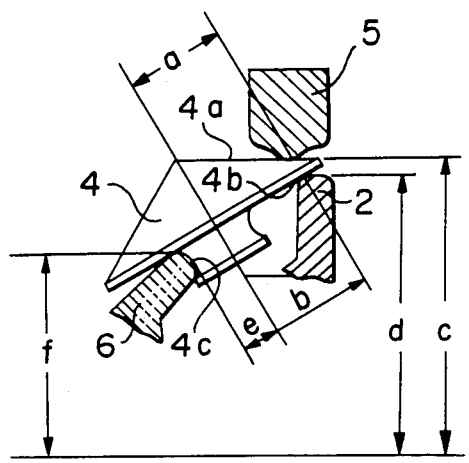
FIG. 4 is a diagram showing effective radii of power transmission elements of the speed-change gear shown in FIG. 1.

FIG. 4 is a diagram showing effective radii a–f of elements in the power transmission system.

When the speed of rotation of the input shaft 1 is expressed by $N_1$ and the speed of rotation of the speed-change ring 5 is expressed by $N_2$, then, $$\frac{N_2}{N_1} = \frac{d\,(ec + fa)}{c\,(ed + fb)}$$

In the equation, $N_2/N_1$, namely the speed of rotation of the pulley 7 with respect to the input shaft 1 can be arbitrarily changed by changing the dimension of a. The effective radii a–f are as follows.

a: an effective radius of the first frictional transmission surface 4a of the planet cones 4 with respect to the speed-change ring 5 b: an effective radius of the second frictional transmission surface 4b of the planet cones 4 to the input-transmission member 2 c: a radius of the inner diameter of the speed-change ring 5 d: an effective radius of the input-transmission member 2 e: an effective radius of the third frictional transmission surface 4c of the plane cones 4 to the orbit ring 6 f: an effective radius of the orbit ring 6

A position of the speed-change ring 5 in the axial direction can be arbitrarily determined by controlling the braking force of the electromagnetic brake 12 by the following manner. The eddy current cup 12c of the electromagnetic brake 12 is rotated at the same speed as the speed-change ring 5 since a rotational force of the ring 5 is transmitted to the cam 13 through the engagement between the cam surface of the cam 13 and the cam follower 14. When the electromagnetic coil 12a is excited by feeding a current, the eddy current cup 12c is subjected to a braking force due to an eddy current produced in the cup 12c and a magnetic field, whereby a cam force having a magnitude in proportional to the braking force causes the cam follower 14 engaged with the cam surface to shift toward the spring 10. A torque of braking of the electromagnetic brake 12 is variable depending on the speed of rotation of the eddy current cup 12c and an exciting current in the electromagnetic coil 12a in the eddy current type electromagnetic brake. However, the magnitude of the braking torque can be controlled by controlling the intensity of the exciting current in the electromagnetic coil 12a by restricting the speed of rotation of the eddy current cup in the operable region. Therefore, the cam force can be in proportional to the braking torque.

Since the cam force acts on the speed-change ring 5 to shift it to a position where the cam force is balanced by a reactive force applied to the speed-change ring 5 by the spring 10. Accordingly, the position of the speed-change ring 5 in the axial direction can be arbitrarily controlled by changing the intensity of the exciting current in the electromagnetic coil 12a, whereby it is possible to control a ratio of the speed of revolution of the pulley 7 to that of the input shaft 1.

An example of controlling the speed of rotation of the pulley 7 which can be performed by electrically controlling the electromagnetic brake 12 will be described with reference to FIGS. 3 and 5.

The optimum speed of rotation of each of the auxiliary devices to save energy varies depending on the auxiliary device itself and the condition of a load. Therefore, a predetermined speed of the pulley for driving the auxiliary devices can be automatically obtained as follows. Signals from the circuits 22, 23, 24 for detecting the condition of a load for each of the auxiliary devices and a signal from the rapidly accelerated condition detecting circuit 25 are input in the operational speed calculating circuit 26 in which the optimum speed of the pulley at instant times in the operation of the engine is calculated from the input signals; the signal output from the calculating circuit 26 is compared with a signal from the pulley speed detection circuit 21 in the comparison circuit 27; and the signal output from the comparison circuit 27 is input in the electromagnetic brake controlling circuit 28 so that an exciting current in the electromagnetic coil 12a is duty-controlled.

Figure 5:
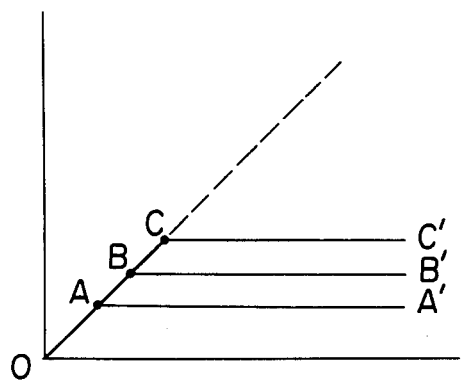
FIG. 5 is a diagram showing a relation between the revolution of an engine and the revolution of a pulley for driving auxiliary devices according to the present invention.

In FIG. 5 showing an example of the rotational speed controlling characteristics, the abscissa represents the speed of rotation of an engine and the ordinate represents the speed of rotation of a pulley for driving auxiliary devices of the auxiliary device driving unit according to the present invention. In FIG. 5, the lines OA, OB and OC indicate regions in which the speed of rotation of the engine is low and the speed of rotation of the pulley is the same as that of the engine, and the lines AA', BB' and CC' indicate regions in which the pulley is controlled to have substantially the same speed at the point A, B or C even though the speed of rotation of the engine increases. Selection of the speed-change points A, B, C are automatically controlled by an output signal from the operational speed calculating circuit 26 shown in FIG. 3.

Although description has been made as to use of the eddy current type electromagnetic brake 12 in the above-mentioned embodiment, it is possible to use a hysteresis type or a powder type electromagnetic brake as a non-contact type electromagnetic brake. Particularly, in the hysteresis or powder type electromagnetic brake, a braking torque being in substantially proportional to an exciting current can be obtained regardless of the speed of rotation of a rotating element. Accordingly, excellent response for controlling is attained even though a manufacturing cost is somewhat expensive.

For the engine of a vehicle used as a prime motor to control the change of speed of the pulley for driving auxiliary devices, it is possible that an input side prime motor is used as a stepless speed-reduction device for a motor to control change of speed of power output members by inputting electrical power.

As described above, in accordance with the present invention, a frictional transmission type stepless speed-change gear with a differential planetary structure and an actuator comprising an electromagnetic brake and a cam mechanism to move a speed-change ring as a speed changing control element of the speed-change gear in the axial direction of the input shaft, are contained in a compact manner in the inner space of a pulley for driving auxiliary devices, and there is provided an electric circuit for automatically controlling the electromagnetic brake by an electrical input signal depending on the condition of operations of each of the auxiliary devices. Accordingly, the auxiliary device driving unit has a space replaceable by the ordinary pulley, while it minimizes production of noises. It saves energy of the auxiliary devices by fine control of speed in response to the condition of the operations of the auxiliary devices. Further, the driving unit of the present invention is largely contributes improvment in fuel cost of the engine and dynamic performance.

I claim:

1. An auxiliary device driving unit connectable to an engine of a vehicle, which has an input shaft connected to a crank shaft of the engine, a pulley connected to auxiliary devices through belts and a transmission system for transmitting a rotational force from said input shaft to said pulley, characterized by comprising:

(a) a frictional transmission type stepless speed-change gear which is provided with an input-transmission member mounted on said input shaft, a plurality of conical planet cones which are rotated around their own axes by receiving a rotational force from said input-transmission member, an orbit ring as a stationary element having frictional engagement with said planet cones to guide the revolution of said planet cones, a speed-change ring which is in frictional contact with the frictional transmission surface including the cone generatrix of each of said planet cones and is shiftable in the direction of the axis of said input shaft, means for transmitting a rotational force of said speed-change ring to said pulley,
(b) a non-contact type electromagnetic brake attached to a fixed plate for supporting said orbit ring as a stationary element of said speed-change gear,
(c) a cam connected to a rotating element of said electromagnetic brake,
(d) a cam follower fixed to said speed change ring and being in contact with said cam, and
(e) an electric circuit for controlling said electromagnetic brake depending on the condition of operations of said auxiliary devices of the engine.

2. An auxiliary device driving unit according to claim 1, wherein each of said planet cones are provided with a first frictional transmission surface on the cone generatrix in the cone portion, a second frictional transmission surface formed in the bottom of the cone portion, a third frictional transmission surface formed in the side surface of a shaft portion extending from the bottom of the cone portion with the same axial line as the cone portion, and a projection projecting from the lower surface of said shaft portion, in which said projection is rotatably supported by a circular disk member having a slanted outer edge so that said cone generatrix of said planet cone extends in parallel to the axial line of said input shaft, and in which said circular disk member is rotatably fitted onto said input shaft.

3. An auxiliary device driving unit according to claim 2, wherein said input transmission member is fitted on said input shaft; has an outer edge which is in frictional contact with said planet cones and is pressed to said planet cones by means of a pressing member having a cam device.

4. An auxiliary device driving unit according to claim 2, wherein said orbit ring is in frictional contact with said second frictional surface formed in the shaft portion of each of said planet cones.

5. An auxiliary device driving unit according to claim 1, wherein speed-change ring is provided with a plurality of roller keys which is fitted in the corresponding key grooves formed in the inner circular wall of said pulley, said key grooves being in parallel to the axial line of said input shaft so that said speed-change ring is movable in that line while it is in frictional contact with said frictional transmission surface of each of said planet cones.

6. An auxiliary device driving unit according to claim 5, wherein a spring is interposed between a side surface of said speed-change ring and a side plate of said pulley.

7. An auxiliary device driving unit according to claim 1, wherein said frictional transmission type stepless speed-change gear, said electromagnetic brake, said cam and cam follower are contained in a space formed inside said pulley, and side openings of said pulley are closed so that noises caused by frictional engagement of the structural elements of said frictional transmission type speed-change gear can be reduced.

* * * * *